(12) United States Patent
Beckmann et al.

(10) Patent No.: US 8,057,713 B2
(45) Date of Patent: Nov. 15, 2011

(54) METHOD FOR THE PRODUCTION OF NICKEL OXIDE SURFACES HAVING INCREASE CONDUCTIVITY

(75) Inventors: Roland Beckmann, Luenen (DE); Karl-Heinz Dulle, Olfen (DE); Peter Woltering, Neuenkirchen (DE); Randolf Kiefer, Gelsenkirchen (DE); Frank Holthuis, Dortmund (DE); Frank Funck, Muelheim (DE); Wolfram Stolp, Hamm (DE); Hans-Joachim Kohnke, Kassel (DE); Joachim Helmke, Calden (DE)

(73) Assignees: UHDE GmbH, Dortmund (DE); Gaskatel Gessellschaft Fuer Gassysteme Durch Katalyse und Elektrochemie mbH, Kassel (DE)

( * ) Notice: Subject to any disclaimer, the term of this patent is extended or adjusted under 35 U.S.C. 154(b) by 1097 days.

(21) Appl. No.: 11/632,790

(22) PCT Filed: Jul. 9, 2005

(86) PCT No.: PCT/EP2005/007464
§ 371 (c)(1),
(2), (4) Date: Sep. 11, 2007

(87) PCT Pub. No.: WO2006/008012
PCT Pub. Date: Jan. 26, 2006

(65) Prior Publication Data
US 2008/0280204 A1   Nov. 13, 2008

(30) Foreign Application Priority Data
Jul. 19, 2004  (DE) .......................... 10 2004 034 886

(51) Int. Cl.
*H01B 1/02* (2006.01)

(52) U.S. Cl. ....... 252/521.2; 204/288; 264/43; 427/115; 427/202; 429/223

(58) Field of Classification Search ............... 252/521.2; 264/43; 427/115, 202; 429/223; 204/228
See application file for complete search history.

(56) References Cited

U.S. PATENT DOCUMENTS 4,898,699 A * 2/1990 Hofmann et al. ............... 264/43
5,077,151 A * 12/1991 Yasuda et al. ................. 429/206
5,264,201 A   11/1993 Dahn et al.
(Continued)

FOREIGN PATENT DOCUMENTS

DE  69212528 T  1/1997
(Continued)

*Primary Examiner* — Khanh Tuan Nguyen
(74) *Attorney, Agent, or Firm* — Marshall & Melhorn, LLC

(57) ABSTRACT

The invention relates to a method for producing electrically conducting nickel oxide surfaces made of nickel-containing material. According to the method, the nickel surface is first degreased and is then roughened for approximately ten minutes in a solution containing about one percent of hydrochloric acid, the process being accelerated by adding hydrogen peroxide solution, resulting in the electrolyte turning green. The nickel surface is briefly wetted, the nickel material is introduced into a solution of 3.5 molar lye to which about ten percent of hydrogen peroxide is added and is kept therein for ten minutes, and the resulting nickel hydroxide surface is dehydrated in a subsequent thermal process and is then further oxidized to obtain nickel oxide. The invention further relates to a conductive boundary layer that is produced according to the method, the electrodes therefrom, and the use thereof in chlorine-alkali electrolysis processes, in fuel cells and storage batteries.

4 Claims, 2 Drawing Sheets

U.S. PATENT DOCUMENTS

| | | | |
|---|---|---|---|
| 5,307,201 A | 4/1994 | Passerini et al. | |
| 6,007,946 A | 12/1999 | Yano et al. | |
| 6,586,483 B2* | 7/2003 | Kolb et al. | 521/91 |
| 7,261,761 B2* | 8/2007 | Kagohashi et al. | 75/343 |
| 2004/0026239 A1 | 2/2004 | Kishimi et al. | |
| 2004/0218345 A1* | 11/2004 | Yadav et al. | 361/500 |

FOREIGN PATENT DOCUMENTS

| | | |
|---|---|---|
| DE | 69124158 T | 6/1997 |
| DE | 8305885 U1 | 9/1997 |
| DE | 69721136 T | 2/2004 |
| EP | 0745700 A1 | 12/1996 |
| JP | 60074272 A | 4/1985 |

* cited by examiner

METHOD FOR THE PRODUCTION OF NICKEL OXIDE SURFACES HAVING INCREASE CONDUCTIVITY

BACKGROUND OF THE INVENTION

The object of this invention is a method for the production of conductive nickel oxide surfaces by chemical doping of the nickel oxide with alkali oxides, in particular for the use of the nickel in electrochemical applications.

In electrochemical processes, chemical reactions are regulated by an external electric current. Inside the electrochemical cells, the electrons must be transported by a conductive, stable and economical conductor. Nickel has thereby turned out to be an ideal material for the electrodes. But one disadvantage is the formation of nickel surfaces that are poor conductors or non-conductive when the electrodes are operated above the nickel hydroxide potential. In many processes, hydroxide formation occurs on account of the low level of this potential.

These poorly conducting or non-conducting hydroxide layers present a problem, for example, when pure nickel is used as the oxygen generation electrode for the electrolysis. But also in systems in which nickel is used in the form of a conductive fabric, an expanded metal mesh or a sheet that comes into contact with catalytically active material such as carbon, platinum-coated carbon etc., the isolating coating has a negative effect. For example, the hydroxide coatings also prevent an optimal current flow on oxygen consumption electrodes.

In zinc/air and nickel/metal-hydride batteries, oxygen cathodes for chlorine-alkali electrolysis and/or oxygen electrodes in alkaline fuel cells, for example, the efficiency of the entire system deteriorates as a result of ohmic losses on the surface of the nickel.

It is known that nickel surfaces can be roughened by mechanical methods to produce better electrical contact between nickel and other components of the electrode, such as activated carbon, for example. However, the initially rather low electrical resistance increases in operation, because the nickel surface becomes coated with non-conductive nickel hydroxide.

An additional method is the reduction of a complete electrode, which takes several hours. With nickel above all, which is in direct contact with carbon, the reduction not only results in the removal of the non-conducting surface, but also in a relatively stable bond between the metallic nickel and the carbon. One disadvantage of this method is that it is not possible, for example, to reduce the air electrode—which is made of activated carbon, manganese dioxide and nickel fabric—of a finished zinc/air battery in only a few hours at the hydrogen potential.

This method can be used in open systems, although the bonds thus formed between the nickel and carbon are not particularly stable. Especially in oxygen generation, the reduction must be repeated after no more than a month, because a new nickel hydroxide layer will have accumulated between the activated carbon and the nickel fabric.

It is known that low-conductivity nickel oxides exhibit a significant increase in conductivity with the addition of a low proportion of lithium oxide [P. J. Fensham, J. Amer. Soc. 76, 969 (1954) Löslichkeit von $LiO_2$ (Solubility of $LiO_2$)]. However, high temperatures are required for the application. For electro chemical applications, however, complicated nickel parts such as fabrics, expanded metal mesh or battery tanks are necessary, which cannot be exposed to high temperature loads, because otherwise they might be deformed.

The prior art also describes solutions for coating glass with conductive nickel oxide, in which lithium is added in measured quantities, thereby forming en electrically conductive coating. However, this method is also used in copiers and in industrial glass. One disadvantage of this process is again the high temperature, as described in DE 692 12 528.

In battery technology, the conductivity of the nickel is important both for the alkaline storage batteries of the nickel/cadmium type as well as for the nickel/metal-hydride type, as described in DE 697 21 136. In lithium batteries, the mounting of the lithium in nickel is likewise known. On this subject, see also DE 691 24 158.

In addition to this high-temperature process, the prior art also describes a low-temperature process in which an active nickel electrode is improved by a treatment in a mixture of KOH, NaOH, BaOH and hydrogen peroxide. In this case, however, the prior art also describes the treatment of an active electrode—and therefore not the treatment of pure metallic surfaces.

BRIEF SUMMARY OF THE INVENTION

The object of this invention is to make available a method that makes it possible to produce conductive nickel oxide surfaces at low temperatures by the chemical doping of nickel oxide with alkali oxides.

The method taught by the invention is disclosed in claim 1. The invention teaches that:
  the nickel surface is first degreased,
  is then roughened for approximately 10 minutes in an approximately 1% hydrochloric acid solution, whereby
  as a result of the addition of hydroxide peroxide solution, the process is accelerated and a greenish color of the electrolyte becomes noticeable, the nickel surface is briefly wetted,
  the nickel material is immersed in a solution of 3.5 molar alkali lye, to which approximately 10% hydrogen peroxide is added, and is and held there for 10 minutes,
  the nickel hydroxide surface thus formed is dehydrated in a thermal process,
  and is then re-oxidized to nickel oxide.
The doped nickel oxide surfaces thus produced are designated conductive boundary layers below and have excellent conductivity.

When the nickel material is immersed in the solution of 3.5 molar alkali lye, a lively oxidation of the nickel occurs. Both potassium hydroxide solution and sodium hydroxide solution or lithium hydroxide solution can be used as the alkali lye.

In one configuration of the method, during the immersion of the nickel material, colloidal carbon and/or hydroxides of iron, cobalt, titanium iridium or platinum are added to the solution of 3.5 molar alkali lye. In additional configurations of the method, the dehydration and the further oxidation are conducted at a temperature of 180° C. In an additional configuration of the method, the nickel used contains alloys of 50 wt. % aluminum and/or 10 wt. % titanium and/or both aluminum and titanium simultaneously.

DETAILED DESCRIPTION OF THE INVENTION

The invention is explained in greater detail below on the basis of 2 examples. Example 1 shows the effect of the nickel surface on the current/voltage characteristic of air electrodes in alkaline electrodes on the basis of FIG. 1 and FIG. 2. Example 2 shows the possible types of doping that can be used.

Example 1

Figure 1:
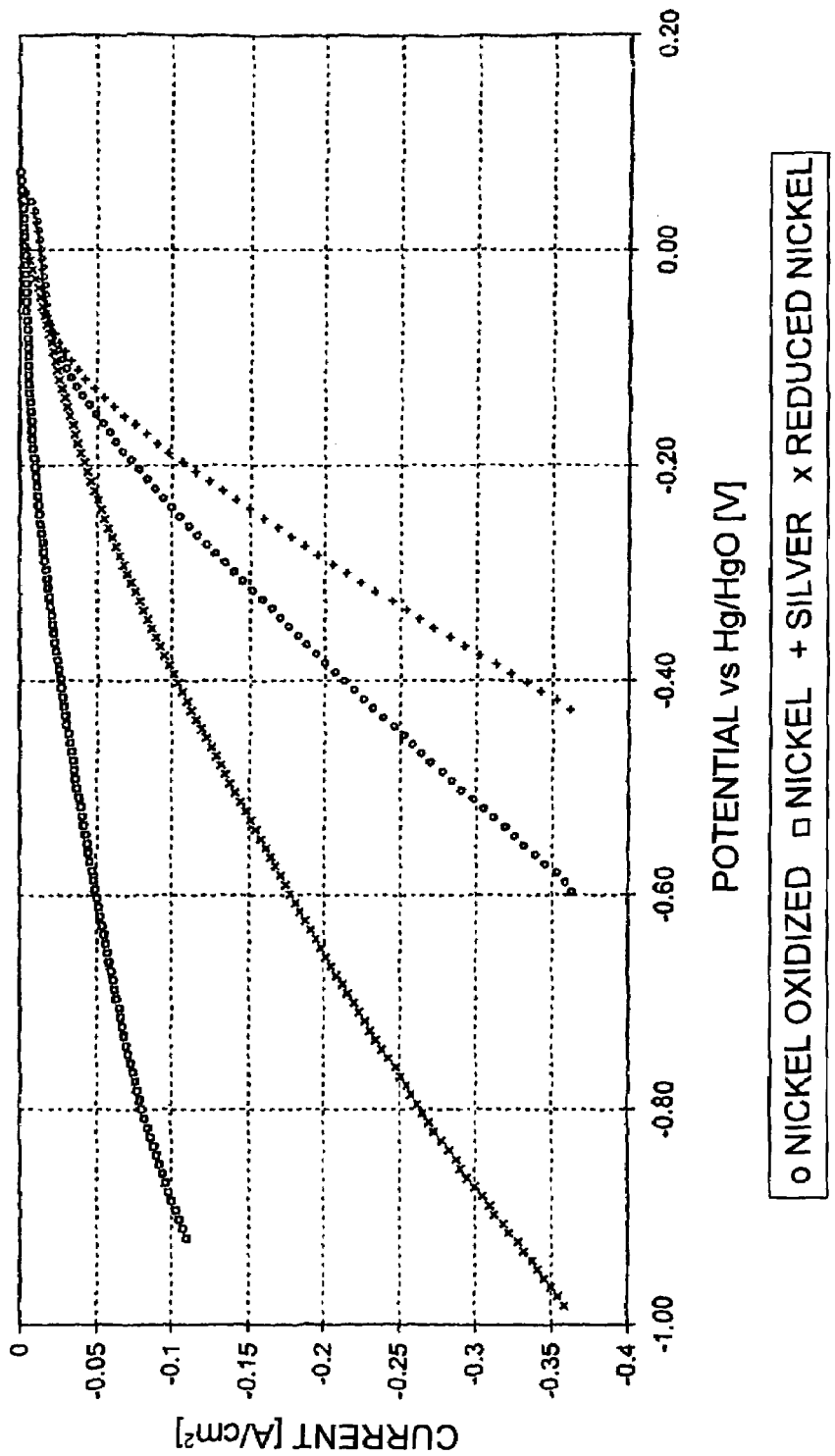
FIG. 1 shows a plot of the influence of nickel discharge electrodes on the electrochemical current-carrying capacity of air electrodes.

The diagram in FIG. 1 plots the influence of nickel discharge electrodes on the electrochemical current-carrying capacity of air electrodes. As the catalytically active material, a mixture of activated carbon and carbon is created according to a "reactive mixing" process. Then the mass is rolled into a metallic discharge electrode. In FIG. 1, the electrochemical values are plotted for untreated nickel, reduced nickel, nickel with a conductive boundary layer and silver. The enormous gain in performance when a nickel fabric with a conductive boundary layer is used instead of the nickel fabric of the prior art. The performance of the air electrode is then comparable to that of air electrodes made of a silver discharge material.

Figure 2:
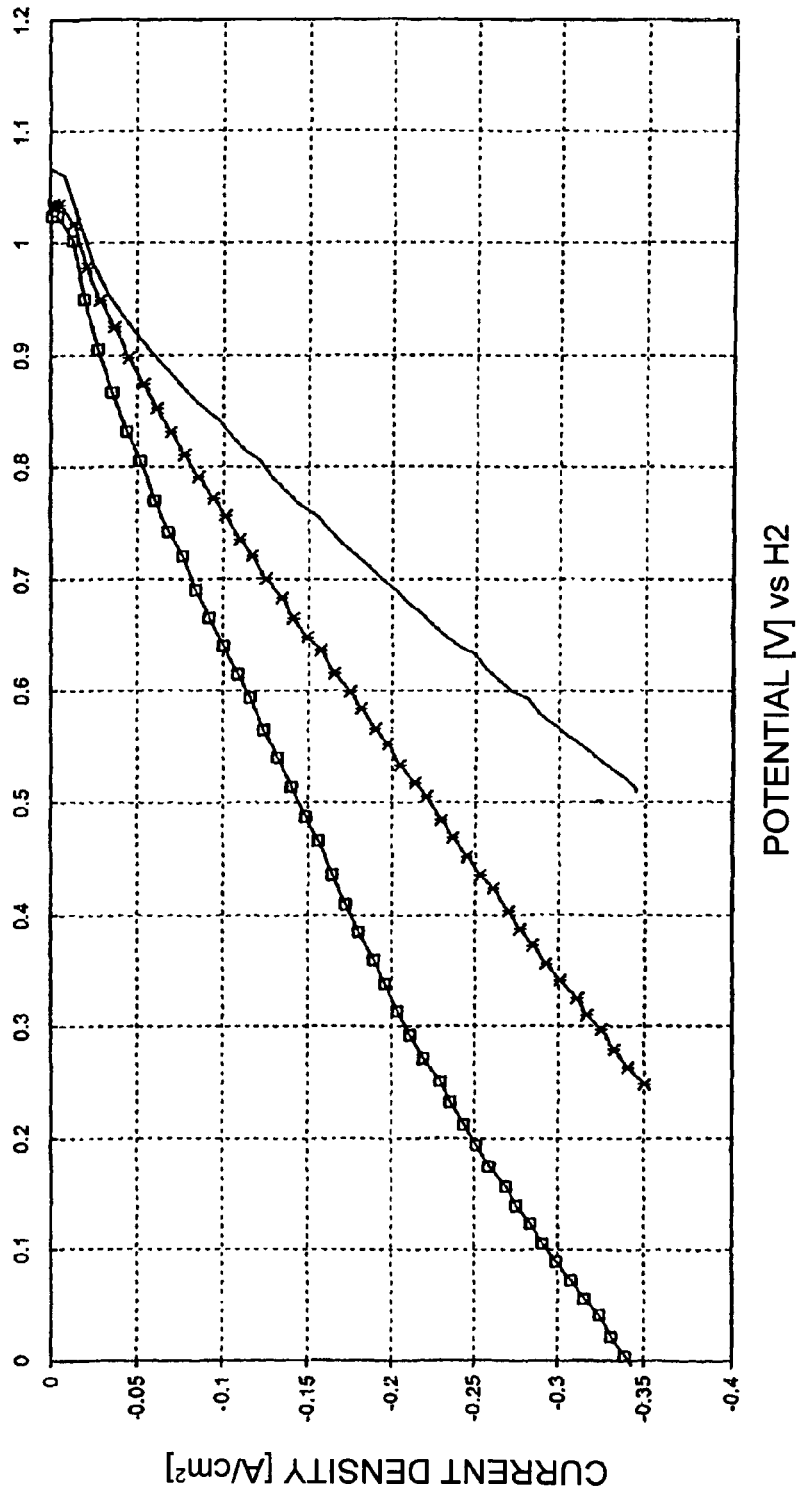
FIG. 2 shows a chart of the positive effects of doped nickel-oxide layers.

A similar picture emerges if silver is used as the active material instead of carbon. Because the silver catalyst itself can also participate in the conductivity, the effects of the nickel corrosion are not as significant as illustrated in FIG. 1. However, the positive influence of the doped nickel oxide layers remains intact, as shown in FIG. 2.

Example 2

Nickel oxide is a known catalyst that can be used for oxygen generation. Therefore a Raney nickel catalyst is frequently used in electrolysis systems. However, there are conditions in which the oxygen generation electrode is required to exhibit the lowest possible electrolytic resistance. In these cases, the prior art does not teach the use of a nickel fabric coated with iridium oxide as a catalyst.

With the doped conductive boundary layers claimed by the invention, a controlled addition of additional catalysts to the nickel oxide is possible. Thus, for example, by the addition of cobalt, iron, iridium or platinum during the formation of hydroxide layers, these layers can also be doped with catalytically active materials. The thickness of the conductive boundary layer can be defined by varying the hold time. If nickel fabrics are coated in this manner, a significantly lower electrolytic resistance has been achieved than is present, for example, in Raney Nickel gas diffusion electrodes. The low temperature at which the nickel oxide surfaces are produced therefore results in very active nickel catalysts.

The conductive boundary layers claimed by the invention can be used as electrodes both in chlorine alkali electrolysis as well as in fuel cells and storage batteries.

The invention claimed is:

1. A method for the production of electrically conducting nickel oxide surfaces made of material containing nickel, comprising:
   degreasing the nickel surface,
   roughening the nickel surface for approximately 10 minutes in an approximately 1% hydrochloric acid solution,
   a hydroxide peroxide solution is added and a greenish color of the electrolyte becomes noticeable after which the reaction can be stopped,
   the nickel surface is briefly wetted,
   the nickel material is immersed in a solution of 3.5 molar alkali lye, to which approximately 10% hydrogen peroxide is added, and is held there for 10 minutes,
   the nickel hydroxide surface thus formed is dehydrated in a thermal process,
   and is then re-oxidized to nickel oxide.

2. The method according to claim 1, wherein during the immersion of the nickel material, colloidal carbon and/or hydroxides of iron, cobalt, titanium iridium or platinum are added to the solution of 3.5 molar alkali lye.

3. The method according to claim 1, wherein the dehydration and the further oxidation of the nickel hydroxide surface are performed at a temperature of 180° C.

4. The method according to claim 1, wherein the nickel used contains alloys of 50 wt. % aluminum or also 10 wt. % titanium and/or both aluminum and titanium simultaneously.

* * * * *